United States Patent [19]
Thelen

[11] 3,854,796
[45] Dec. 17, 1974

[54] REFLECTION-REDUCING COATING

[75] Inventor: Alfred Thelen, Triesen, Liechtenstein

[73] Assignee: Balzers Patent-und Beteiligungs-Aktiengesellschaft, Balzers, Furstentum, Liechtenstein

[22] Filed: Sept. 17, 1973

[21] Appl. No.: 397,851

[30] Foreign Application Priority Data
Oct. 19, 1972  Switzerland................. 015336/72

[52] U.S. Cl.............................. 350/164, 117/33.3
[51] Int. Cl..................................... G02b 5/28
[58] Field of Search................. 350/1, 163–166; 117/33.3

[56] References Cited
UNITED STATES PATENTS
| | | | |
|---|---|---|---|
| 3,185,020 | 5/1965 | Thelen | 350/164 |
| 3,737,210 | 6/1973 | Howe | 350/166 |
| 3,738,732 | 6/1973 | Ikeda | 350/164 |

*Primary Examiner*—Ronald J. Stern
*Attorney, Agent, or Firm*—McGlew and Tuttle

[57] ABSTRACT

A reflection-reducing coating for a substrate comprises a plurality of single or composite lambda/4 layers arranged successively outwardly from the substrate. The layers include three groups of at least two lambda/4 layers with the successive layers of the first group having a refractive index which decreases below the refractive index of the substrate, the layers of the second group having an increasing refractive index, and the layers of the third group having a refractive index which decreases below the refractive index of the substrate.

7 Claims, 8 Drawing Figures

REFLECTION-REDUCING COATING

BACKGROUND OF THE INVENTION

1. Field of the Invention

This invention relates in general to the construction of optical coatings and, in particular, to a new and useful reflection-reducing coating for a substrate which comprises a plurality of single or composite lambda/4 layers.

2. Description of the Prior Art

Only recently has it been possible to develop reflection-reducing layer systems that can be manufactured in a practical manner and which exhibit a low reflection not only in a relatively narrow wavelength range but in the entire visible range (A. Musset and A. Thelen, Multilayer Antireflection Coatings, Progress in Optics, Vol. 8, New York 1970). Despite the great effectiveness of these systems, often a still greater band width extending beyond the visible spectral range would be desirable. There are, for instance, optical lens systems which are to be used not only for reproduction in the visible range but also for reproduction in the near infra-red range. For such systems normal multilayer reflection reduction in the known manner would be worse than none at all, as the reflection of these known layer systems increases very sharply outside the useful (or effective) range.

Moreover, even for reflection reduction in the visible range it would often be desirable to have a greater band width available. In fact, since for all interference systems thickness variations are equivalent to wavelength shifts and changes of the angle of incidence, it would be possible with systems of a wider band to increase the thickness tolerance in their manufacture, i.e., to reduce their cost, or to permit a greater variation of the angle of incidence, so that, for instance, optical parts with relatively great curvature could still be made non-reflecting satisfactorily.

SUMMARY OF THE INVENTION

The wide-band systems for reflection reduction known until now, consisting of several layers, can generally be reduced to systems with layers of equal thickness and may then be regarded as being built up of two groups of layers. Counting from the substrate, a first group comprises layers with increasing index of refraction, while a following second layer group comprises layers with decreasing refractive index. By "increasing" and "decreasing" index of refraction there is understood in the following that within the group thus identified the successive layers have an increasingly higher or lower index of refraction. In the above-mentioned first layer group with increasing index of refraction, therefore, the first layer has a certain index of refraction, the second layer a higher index of refraction than the first layer and, if the group comprises three or more layers, the third and each following layer a higher index of refraction than the respective preceding layer, until the group is complete. According to the present state of the art, more than two single layers in each group have not been used in reflection-reducing coatings. For the layer group with decreasing index of refraction, the above statements apply analogously.

Accordingly, it is an object of the invention to provide a reflection-reducing coating for a substrate which comprises a plurality of layers which, in the order of their occurrence from the substrate, include three groups of at least two lambda/4 layers, the successive layers of the first group having a refractive index decreasing below the refractive index of the substrate, the layers of the second group having an increasing refractive index and the layers of the third group having a refractive index decreasing below the refractive index of the substrate.

A further object of the invention is to provide an improved coating for reducing reflection which is of simple and inexpensive construction.

For an understanding of the principles of the invention, reference is made to the following description of typical embodiments thereof as illustrated in the accompanying drawings.

GENERAL DESCRIPTION OF THE PREFERRED EMBODIMENT

A typical composition of a known system for a wide-band reflection reduction is a system invented by Alfred Thelen entitled "Three Layer Antireflection Coating," and described in U.S. Pat. No. 3,185,020.

Figure 1:
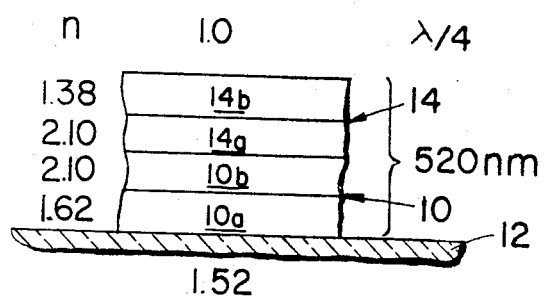
FIG. 1 is a sectional view of a known substrate coating of the prior art.
Figure 1A:
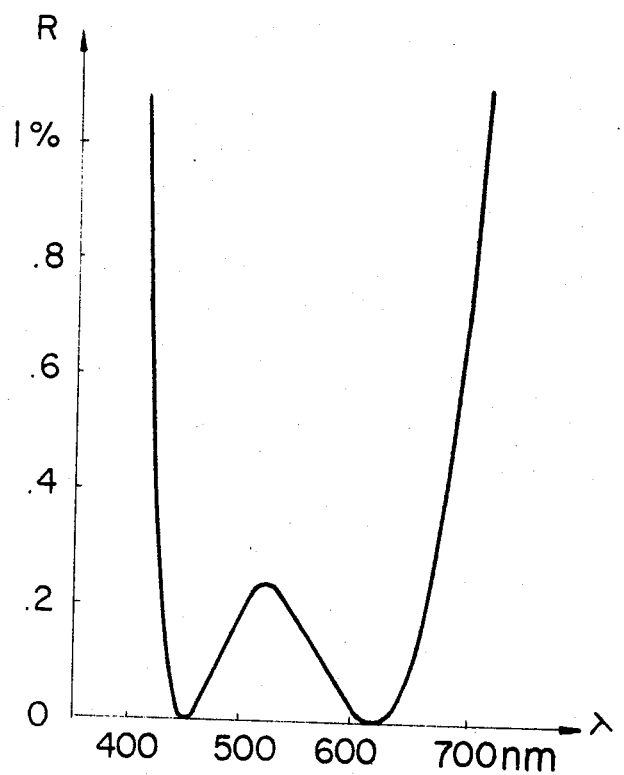
FIG. 1a is a reflection curve for the coating shown in FIG. 1.

FIG. 1 shows schematically such a known reflection-reducing layer system and FIG. 1a indicates a reflection curve for the system. The system consists of a first layer group 10 applied on a support 12 of the index of refraction 1.52 (glass), and consisting of two layers 10a and 10b with increasing index of refraction of 1.62 and 2.10. A second group 14 follows which also consists of two layers 14a and 14b, with refractive indexes 2.10 and 1.38 decreasing within the group. The latter layer is adjacent to air with refractive index 1. Each individual one of said layers has an optical layer thickness of lambda/4, referred to a wavelength of 520 nm.

As can be seen from the reflection curve shown in FIG. 1a, in such a multilayer system the reflection increases very sharply again below about 450 nm and above about 650 nm, reaching the value of 1 percent at about 400 and 700 nm which, in view of the very low reflection (average 0.1 percent) really aspired to by this system in the operating range, often appears inadmissible.

In accordance with the invention, a new multilayer system for a reflection-reducing coating with increased useful range is provided. The reflection-reducing coating according to the invention comprises a plurality of single or composite lambda/4 layers and is characterized in that, in the order of enumeration starting from the substrate, three groups of at least two lambda/4 layers each are applied thereon, the successive layers of the first group having a refractive index decreasing below the refractive index of the substrate, the layers of the second group a refractive index increasing again, and the layers of the third group a refractive index again decreasing below the refractive index of the substrate.

It has been found, surprisingly, that the wide band nature of reflection reducing coatings can be greatly improved by inserting in the stated manner another group of layers with decreasing index of refraction between the substrate and the first layer group with increasing index of refraction used in known systems. By a lambda/4 layer it is understood in connection with this specification, a layer for which the product of layer thickness times index of refraction (the so-called optical layer thickness) is equal to one-fourth the reference wavelength of the system. The reference wavelength of the system is that wavelength whose respective frequency represents the mean of the frequencies of the two limits of the useful range (of the flanks at which the reflection increases steeply again). It equals the center-of-gravity wavelength for which the system is constructed.

Figure 2:
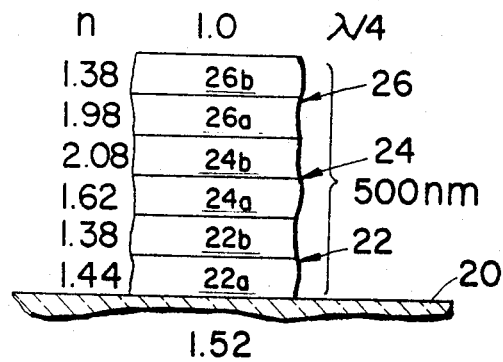
FIG. 2 is a sectional view of a reflection-reducing coating constructed in accordance with the invention.
Figure 2A:
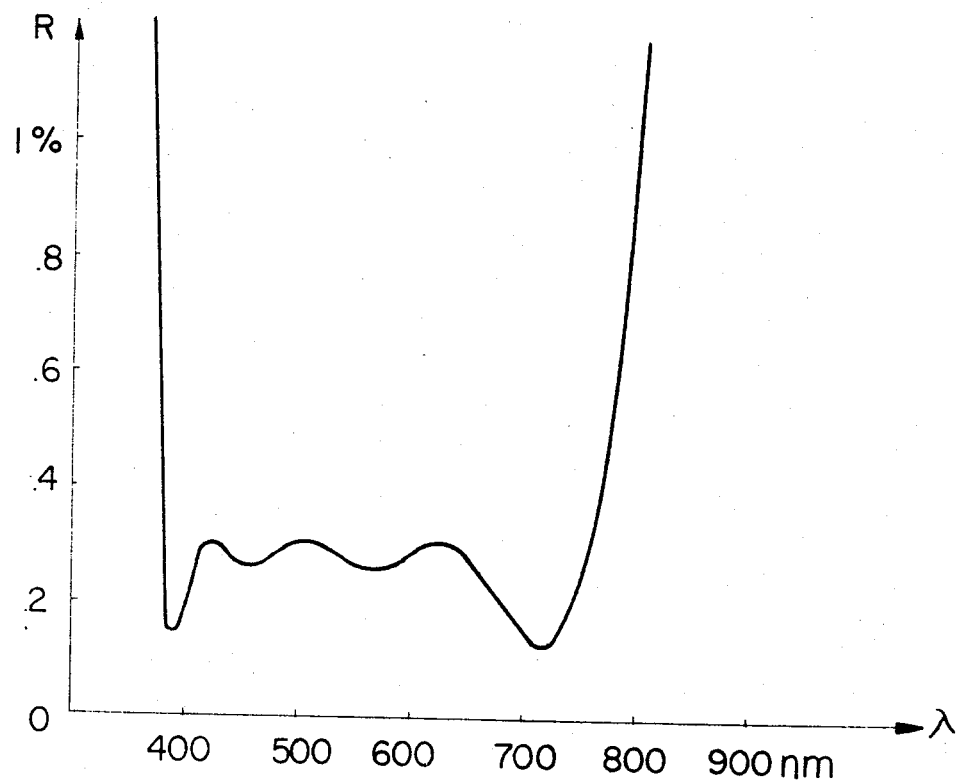
FIG. 2a is a reflection curve of the substrate shown in FIG. 2.

FIG. 2 shows an embodiment of the invention in which a layer system consists of six single layers. On a substrate 20 with index of refraction 1.52 there are applied as a first layer group 22 two layers 22a and 22b with decreasing index of refraction, namely layers with $n = 1.44$ and $n = 1.38$. Then follows a second layer group 24 with layers 24a and 24b having the increasing refractive indexes 1.62 and 2.08, and lastly the third group 26 again with layers 26a and 26b having decreasing refractive indexes of 1.98 and 1.38. The system is constructed for a reference wavelength of 500 nm; accordingly each single layer has an optical thickness of one-fourth of the stated wavelength (that is 125 nm).

With this system, the refleciton reduction likewise illustrated in FIG. 2 is achieved on the stated glass substrate. For a mean reflection of 0.25 percent there can be read from it a useful width of about 380 to 750 nm, representing an appreciable improvement, for instance, for application to lens systems for colortrue reproduction.

Figure 3:
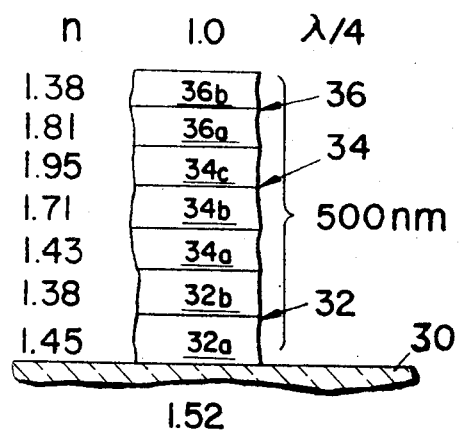
FIGS. 3, 3a and 4, 4a show alternate embodiments of coatings and reflection curves therefor.
Figure 3A:
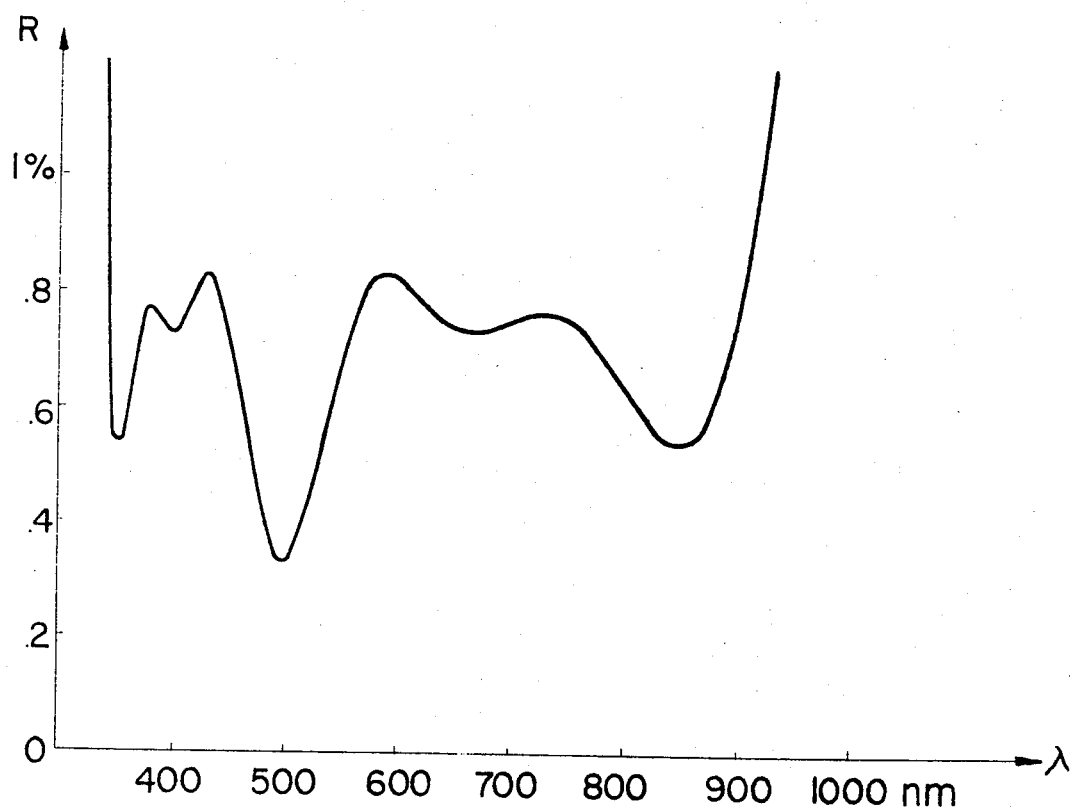

Analogously FIG. 3 shows a further example of the invention including a substrate 30 with a first layer group 32 consisting of two lambda/4 layers 32a and 32b, a second layer group 34 consisting of three lambda/4 layers 34a, 34b and 34c, and a third layer group 36 again with two lambda/4 layers 36a and 36b, so that this layer system comprises a total of seven single layers, each of which has an optical thickness of 125 nm, so that the entire coating has an optical thickness of 875 nm. The first layer group 32 consists in this case of the layers with the refractive indexes 1.45 and 1.38, the second group 34 of the three successive layers with the refractive indexes 1.43, 1.71 and 1.95, and the third group 36 finally of the two layers with the refractive indexes 1.81 and 1.38.

As the respective reflection curve indicates, this system results in a further widening of the useful range, which now extends from about 350 to 900 nm, the mean of the reflection in said range, of about 0.7 percent, being already relatively high. Nevertheless this is an improvement inasmuch as a reflection reduction is achieved by this system in a useful range of a width not previously realizable, so that this system can be used, for example, in the case of an optical system to be used for visible light and infra-red, whereas for instance, the layer system described in FIG. 1 could not be used for this despite its much lower mean reflection in the useful range.

As is known, any lambda/4 layer can be replaced effectively by a layer combination composed of several partial layers. Such a substitute combination is termed in the following, a composite lambda/4 layer.

In particular, it is known that any non-absorbing layer can be replaced by a symmetrical combination of three single layers (L. I. Epstein, The Design of Optical Filters, Journ. Opt. Soc. Am. 42, 806 (1952)) This can be utilized to derive from a known system equivalent systems with more favorable refractive index combinations (P. H. Berning, Use of Equivalent Films in the Design of Infra-red Multilayer Antireflection Coatings, Journ. Opt. Soc. Am. 52, 431 (1962)). By applying this known method of the substitution of homogeneous lambda/4 layers of a system by composite lambda/4 layers in the present invention, one gets to additional examples of construction. Although such a derived layer system has more layers than the primary system on which it is based, it is often easier to produce, namely when one can get along in this manner with available and tested layer materials, whereas for the primary system layer materials might be necessary with an index of refraction which are not available or are available only in an unsatisfactory quality. According to the present state of the art, in fact, only a limited selection of layer materials for different refractive indexes exist. The substitution of single layers by layer combinations, that is, the use of composite layers, sometimes constitutes the more practical possibility for the realization of a system according to the invention.

Figure 4:
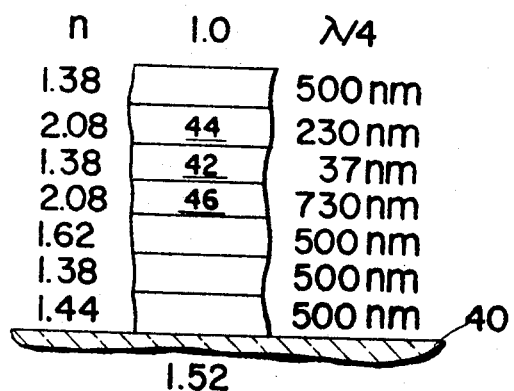
Figure 4A:
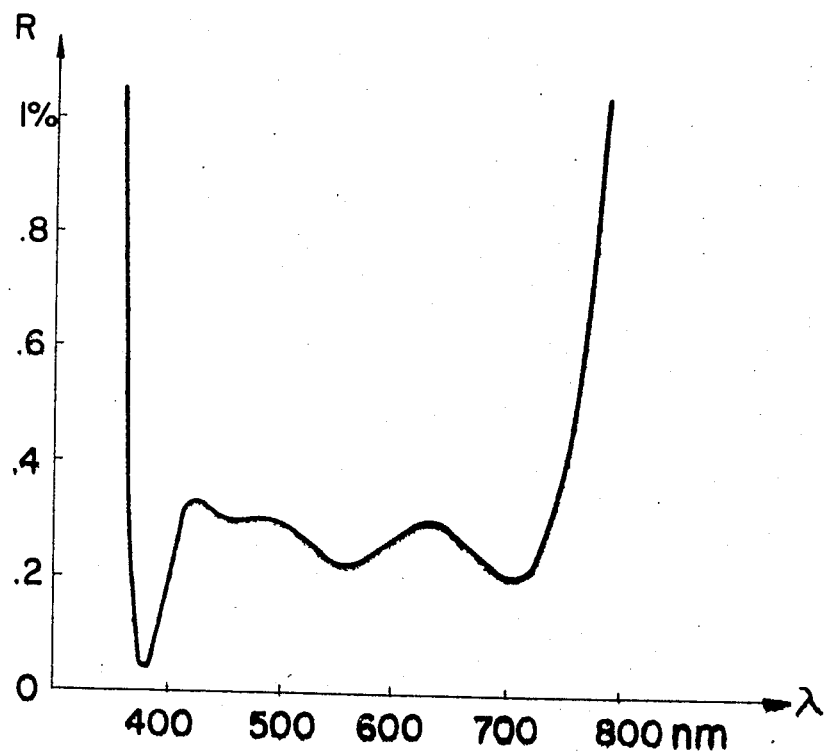

FIG. 4 shows such an equivalent layer system, which has been derived from that of FIG. 2 by substitution of single lambda/4 layers by composite lambda/4 layers, in that (counted from the substrate) the fifth layer 42 with the refractive index 1.98 was replaced by a symmetrical combination of three layers, consisting of a central partial layer 42 of 37/4 nm optical thickness and with the refractive index 1.38 and two adjacent partial layers 44 and 46 of 230/4 nm optical thickness and with the refractive index 2.08. The result then is that the one of the mentioned partial layers with the refractive index 2.08 together with the contiguous fourth (counted from the substrate) layer 46 of the primary system, which has a thickness of 500/4 nm and again a refractive index of 2.08, forms a composite thicker layer with the refractive index 2.08, having a total thickness of 730/4nm. It should be noted in connection with the thickness data that, following a common usage in the literature on multilayer systems, these have been stated by that wavelength for which the considered layer would just (or precisely) have an optical thickness of lambda/4. Since, as has been mentioned, the optical thickness equals the product of real thickness times refractive index, the real thickness of each single layer can be calculated by dividing the optical thickness by the index of refraction.

As can be seen from a comparison of FIGS. 2 and 4, by the trick of using equivalent layer combinations, the layer material with the index of refraction 1.98 can be avoided, this being an advantage in production technique. The transmission curve of FIG. 4 shows that essentially the same optical result is achieved as with the layer system of FIG. 2; the slight deviations are attributable to the different dispersion of single and of composite lambda/4 layers.

In similar manner an equivalent system can be derived from the layer system of FIG. 3 by replacement of the fourth, fifth and sixth layers. The fourth layer with refractive index 1.71 and thickness 500/4 nm was replaced by a layer combination consisting of a central partial layer with the refractive index 2.08 and the thickness 171/4 nm, to which is adjacent on either side a partial layer with the refractive index 1.38 and the thickness 158/4 nm. The fifth layer of the layer system of FIG. 3 was replaced by a triple layer with a central partial layer with the refractive index 2.08 and the thickness 315/4 nm and two adjacent partial layers with the refractive index 1.38 and a thickness of 87/4 nm. Lastly, the sixth partial layer of FIG. 3, was replaced by a triple layer consisting of a central partial layer with the refractive index 2.08 and the thickness 225/4 nm and partial layers adjacent on both sides with the refractive index 1.38 and the thickness 130 nm.

For this example, therefore, one obtains the following layer composition:

| RUNNING NUMBER | $n$ | $4s$ | | $s$ in nm | $s/\lambda_0$ |
|---|---|---|---|---|---|
| 7 | 1.38 | 500 nm | } 650 nm | 157.5 | 0.32 |
|   | 1.38 | 130 nm | | | |
| 6* | 2.08 | 225 nm | | 56.25 | 0.11 |
|    | 1.38 | 130 nm | } 217 nm | 54.25 | 0.11 |
|    | 1.38 | 87 nm  | | | |
| 5* | 2.08 | 315 nm | | 78.75 | 0.16 |
|    | 1.38 | 87 nm  | } 245 nm | 61.25 | 0.12 |
|    | 1.38 | 158 nm | | | |
| 4  | 2.08 | 171 nm | | 42.75 | 0.09 |
|    | 1.38 | 158 nm | | 39.5 | 0.08 |
| 3 | 1.45 | 500 nm | | 125 | 0.25 |
| 2 | 1.38 | 500 nm | | 125 | 0.25 |
| 1 | 1.45 | 500 nm | | 125 | 0.25 |
| SUBSTRATE | 1.52 | | | | |

$n$ = Index of refraction
$s$ = Optical layer thickness
$\lambda_0$ = Reference wavelength
* = Composite lambda/4 layer If again contiguous layers of the same material are conceived combined as one layer (which can be manufactured in one operation), one thus obtains a system of 10 single layers, composed of three different layer materials with the refractive indexes 1.38, 1.45 and 2.08. The derived system, therefore, is easier to produce than the primary system according to FIG. 3 despite the fact that it contains more single layers.

In the above described examples, the layer thicknesses are calculated for a reference wavelength of 500 nm. One obtains therefrom additional examples for other reference wavelengths, in that the stated layer thicknesses are varied accordingly (proportional to the reference) wavelength; for example, for a reference wavelength of 400 nm the stated thicknesses would have to be multiplied by the factor 400:500 = 0.08, for a reference wavelength of 600 nm by the factor 600:500 = 1.2.

For the stated examples there enters into consideration especially, the following layer materials:
Magnesium fluoride for the refractive index 1.38;
Silicon dioxide for the refractive index 1.43 to 1.45;
Aluminum dioxide for the refractive index 1.62; and
Zirconium dioxide for the refractive index 2.08.
Naturally, other known layer materials of sufficient freedom from absorption and suitable index refraction can, of course, be used.

The following additional examples are cited. In the interest of simplicity, however, only the basic systems consisting of nothing but lambda/4 layers are stated therein. To deermine these, the order of the refractive indexes is sufficient. The first (bracketed) number gives the refractive index of the substrate, then follow the refractive indexes of the layers, and lastly (bracketed) that of the contiguous medium, i.e., generally air with the refractive index 1.

EXAMPLE 5

(1.52), 1.45, 1.38, 1.38, 1.62, 2.08, 2.08, 1.38 (1.0).

This is a seven-layer system, and it is interesting to note that twice two contiguous lambda/4 layers have the same index of refraction, and hence can, considered combined as a lambda/2 layer, be manufactured in one operation. In this system the first two layers with decreasing refractive index (1.45, 1.38) form the first layer group, the next three layers with increasing refractive index (1.38, 1.62, 2.08) the second group, and the last two layers again with decreasing refractive index (2.08, 1.38) the third group is the sense of the patent claim. This system is outstanding for its especially low reflection at moderately enlarged band width.

EXAMPLE 6

(1.62), 1.53, 1.45, 1.72, 2.22, 2.08, 1.38 (1.0).

As can be seen from the refractive index of 1.62 given for the substrate, this is a reflection-reducing layer system for a high-refractive gas.

EXAMPLE 7

(1.52) 1.45, 1.38, 1.38, 1.62, 2.10, 2.35, 1.96, 1.38 (1.0).

There are present here eight lambda/4 layers, whereby a particularly great band width is achieved.

In the above as well as in the following examples it should always be noted that each of the stated single lambda/4 layers could be replaced by a composite lambda/4 layer. Although, as explained above, this leads to more layers in the system, one obtains at the same time the advantage that the layer materials can be selected more freely according to technological viewpoints, as it is always possible to get to a composite lambda/4 layer of the required refractive index by combination of a suitable material of higher index with one of lower index of refraction.

The following examples are cited:

EXAMPLE 8

(1.52), 1.45, 1.38, 1.50, 1.87, 2.35, 1.92, 1.38 (1.0);

EXAMPLE 9

(1.52), 1.45, 1.38, 1.75, 2.30, 2.10, 1.38 (1.0) and

EXAMPLE 10

(1.52), 1.45, 1.38, 1.38, 1.53, 1.95, 1.95, 1.38 (1.0), show additional possibilities of construction of the principle according to the invention. In every case one obtains an improved wide-band reflection reduction if, as set forth, one provides the three groups of at least two layers each and with the progression of the refractive index specified according to the patent claim.

While specific embodiments of the invention have been shown and described in detail to illustrate the application of the principles of the invention, it will be understood that the invention may be embodied otherwise without departing from such principles.

What is claimed is:

1. A reflection-reducing coating for a substrate comprising a plurality of layers wherein, in the order of enumeration starting from the substrate, there are, three groups of at least two lambda/4 layers, the successive layers of the first group having a refractive index decreasing below the refractive index of the substrate, the layers of the second group having an increasing refractive index and the layers of the third group having a refractive index decreasing below the refractive index of the substrate.

2. A reflection-reducing coating, according to claim 1, wherein said coating comprises six lambda/4 layers.

3. A reflection-reducing coating, according to claim 1, wherein at least one layer of the third group is formed as a composite lambda/4 layer.

4. A reflection-reducing coating, according to claim 1, wherein the composite lambda/4 layers include one central and two outer partial layers symmetically contiguous thereto, the central partial layer having a higher refractive index, the contiguous partial layers a lower refractive index than the single lambda/4 layer, to which the composite layer is equivalent.

5. A reflection-reducing coating, according to claim 1, wherein the coating is composed of six layers with an optical thickness of lambda/4 of the reference wavelength, of which the fifth layer is formed as a composite lambda/4 layer.

6. A reflection-reducing coating, according to claim 1, wherein the coating is composed of several layers of lambda/4 optical thickness of the reference wavelength, of which the fourth, fifth and sixth layers are formed as composite layers.

7. A reflection-reducing coating, according to claim 1, wherein the coating is composed of the following layers and partial layers:

| | | |
|---|---|---|
| First layer: | $n = 1.45$ | $s = 0.25$ lambda$_o$ |
| Second layer: | $n = 1.38$ | $s = 0.25$ lambda$_o$ |
| Third layer: | $n = 1.45$ | $s = 0.25$ lambda$_o$ |
| Fourth layer: | $n = 1.38$ | $s = 0.08$ lambda$_o$ |
| Fifth layer: | $n = 2.08$ | $s = 0.09$ lambda$_o$ |
| Sixth layer: | $n = 1.38$ | $s = 0.12$ lambda$_o$ |
| Seventh layer: | $n = 2.08$ | $s = 0.16$ lambda$_o$ |
| Eighth layer: | $n = 1.38$ | $s = 0.11$ lambda$_o$ |
| Ninth layer: | $n = 2.08$ | $s = 0.11$ lambda$_o$ |
| Tenth layer: | $n = 1.38$ | $s = 0.32$ lambda$_o$ |

$n$ being the index of refraction, $s$ the optical thickness and lambda$_o$ the reference wavelength.

* * * * *